US012699194B2

(12) United States Patent
Zhang et al.

(10) Patent No.: US 12,699,194 B2
(45) Date of Patent: Aug. 4, 2026

(54) PHYSICAL MODEL TEST SYSTEM FOR SIMULATING STRONG MINE TREMORS BASED ON JOINT MONITORING OF MICROSEISMIC AND ACOUSTIC EMISSION AND TEST METHOD THEREOF

(71) Applicant: SHANDONG UNIVERSITY, Jinan (CN)

(72) Inventors: Qiangyong Zhang, Jinan (CN); Hanxiang Lin, Jinan (CN); Kang Duan, Jinan (CN); Yuyong Jiao, Jinan (CN); Pengfei Wang, Jinan (CN); Yu Zhao, Jinan (CN); Changpeng Chen, Jinan (CN); Zebing Wang, Jinan (CN); Yong Huang, Jinan (CN); Hong Zou, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 20 days.

(21) Appl. No.: 18/987,465

(22) Filed: Dec. 19, 2024

(65) Prior Publication Data

US 2025/0321346 A1     Oct. 16, 2025

(30) Foreign Application Priority Data

Apr. 12, 2024     (CN) .......................... 202410442673.6

(51) Int. Cl.
| | |
|---|---|
| *G01V 1/18* | (2006.01) |
| *G01V 1/20* | (2006.01) |
| *G01V 1/28* | (2006.01) |

(52) U.S. Cl.
CPC ............... *G01V 1/189* (2013.01); *G01V 1/20* (2013.01); *G01V 1/288* (2013.01); *G01V 2210/14* (2013.01)

(58) Field of Classification Search
CPC .......... G01V 1/189; G01V 1/20; G01V 1/288; G01V 1/01; G01V 1/18; G01V 1/282; G01V 1/30; G01V 2210/14
See application file for complete search history.

(56) References Cited

U.S. PATENT DOCUMENTS 11,835,431 B1    12/2023  Zhang et al.
2019/0078987 A1*    3/2019  Zhang ..................... G01N 33/24

FOREIGN PATENT DOCUMENTS

CN          107219122 A       9/2017
CN          107907431 A    *  4/2018    ............... G01N 3/36
(Continued)

OTHER PUBLICATIONS

Nov. 29, 2024 Office Action issued in Chinese Patent Application No. 202410442673.6.
(Continued)

*Primary Examiner* — Lal Ce Mang
(74) *Attorney, Agent, or Firm* — Oliff PLC

(57)     ABSTRACT

A physical model test system for simulating strong mine tremors based on joint monitoring of MS and AE and a test method thereof, comprising: positioning and drilling a circular hole in a load plate according to design positions of all-fiber MS and AE sensors; mounting limiting rings concentric with the circular holes outside the load plates; bonding seismic isolation antifriction plates on inner walls of the load plates; manufacturing model body through layered compaction method to a height reaching one of the circular holes; inserting wave conducting rod into the limiting ring and the circular hole sequentially to a specified depth of the model body; filling with analogue materials and compacting; detaching the limiting rings after the model body is stably loaded, connecting the all-fiber MS sensors to exposed portion of the wave conducting rod, and bonding (Continued)

the AE sensors to outer sidewalls of the wave conducting rods.

7 Claims, 4 Drawing Sheets

(56)                     References Cited

FOREIGN PATENT DOCUMENTS

| CN | 109855974 A | * | 6/2019 | ............... G01N 1/28 |
|----|-------------|---|--------|--------------------------|
| CN | 111537217 A | * | 8/2020 | ............ G01D 21/02 |
| CN | 115273634 A |   | 11/2022 | |
| CN | 115561319 A | * | 1/2023 | ............ G01N 29/14 |
| CN | 115826034 A |   | 3/2023 | |
| CN | 116086983 A |   | 5/2023 | |
| CN | 116337628 A |   | 6/2023 | |
| CN | 116448569 A |   | 7/2023 | |
| WO | 2020/118776 A1 | | 6/2020 | |

OTHER PUBLICATIONS

Shi, Xinshuai et al. "Development and application of a large scale 3D roadway rockburst disaster evolution and instability simulation test system." Chinese Journal of Rock Mechanics and Engineering. vol. 40, No. 3, pp. 556-565, 2021.

* cited by examiner

PHYSICAL MODEL TEST SYSTEM FOR SIMULATING STRONG MINE TREMORS BASED ON JOINT MONITORING OF MICROSEISMIC AND ACOUSTIC EMISSION AND TEST METHOD THEREOF

TECHNICAL FIELD

The present invention relates to the technical field of model tests of spontaneous dynamic phenomena such as strong mine tremors in the field of deep mining engineering, and in particular, to a large-scale true three-dimensional (3D) model test system and test method for simulating spontaneous fracture of high thick-and-hard overlying strata caused by deep coal seam mining under complex conditions and inducing strong mine tremors.

BACKGROUND

As coal mining goes deeper, geological occurrence environment is more complex, engineering disturbance response is more drastic, and mining-induced earthquakes are more intense. As a result, the strong mine tremors, which are mining-induced earthquakes with energy exceeding 100,000 J, are evolving from a problem of safe mining of resources to a problem of social public safety. Therefore, the in-depth revelation of the formation and evolution mechanism of strong mine tremors has become a pressing major technical problem to be resolved. On-site monitoring is costly, risky, and condition-limited, while numerical simulations struggle to replicate real disasters, and theoretical analyses fall short in addressing complex geological environments. A geomechanical model test has unique advantages over the foregoing methods in terms of discovering new phenomena, exploring new laws, and revealing new mechanisms. Therefore, it is necessary to carry out a true 3D model test of the formation and evolution mechanism of strong mine tremors under complex conditions. To carry out the model test, it is necessary to have a model test system and test method for monitoring vibration signals. The current state of relevant research is as follows:

Patent CN116448569A discloses a physical model testing device for combined monitoring of collapse-type mining-induced tremors and a method thereof, in which only acoustic emission (AE) monitoring is taken into consideration, and the AE sensors are embedded inside a similar material model body. This method is not conducive to the repair and replacement of AE sensors, has limited signals for monitoring stratum vibrations, and is not applicable to large-scale true 3D model tests of strong mine tremors.

A large-scale 3D model test system for the evolution and instability of roadway rockburst disasters is introduced in Chinese Journal of Rock Mechanics and Engineering, issue 3, Vol. 40 (2021), and is mainly formed by a static loading system, a model casting apparatus, a model conveying apparatus, a blasting dynamic load application system, a data monitoring system, and other related components. The system cannot simulate spontaneous dynamic phenomena such as strong mine tremors, and cannot monitor vibration signals generated in stratum breaking.

Patent CN116337628A discloses a method and device for simulating active fracture stick-slip induced earthquakes under 3D stress conditions. The method involves arranging microseismic (MS) sensors around the model body to monitor the initiation and propagation of rock fractures during the experiment, as well as the variations in at least one of the seismic wave peak acceleration, amplitude, and frequency during the experiment. However, the patent does not provide a detailed implementation method.

In general, at present, relevant existing model test methods at home and abroad generally have the following problems:

(1) An existing model test system cannot simulate strong mine tremors induced by the spontaneous breaking of overburden, nor can it automatically acquire vibration signals generated by overburden breaking within the model body.

(2) An existing true 3D loading model test system cannot flexibly adapt to extracting model tests of coal seams with different locations and thicknesses.

SUMMARY

To overcome the foregoing deficiencies in the related art, the present invention provides a physical model test system for simulating strong mine tremors based on joint monitoring of MS and AE and a test method thereof. The present system can monitor vibration signals generated by the spontaneous breaking of overburden due to coal seam extraction, enable visualized observation of fissure extension and stratum breaking, simulate various working conditions, such as different positions and thicknesses of coal seam, and provide a true 3D ground stress field.

To achieve the foregoing objective, the present invention discloses the following technical solutions.

According to a first aspect, the present invention provides a physical model test system for simulating strong mine tremors based on joint monitoring of MS and AE, comprising a model test rack, wherein a plurality of hydraulic jacks are mounted on an inner wall of the model test rack, to drive load plates applying a load to a model body; wave conducting rods, wherein a built-in portion of each of the wave conducting rods is inserted inside the model body, and an exposed portion of the each of the wave conducting rods extends to an outer side of the load plate; all-fiber MS sensors are installed at ends of exposed sections of the wave conducting rods, with AE sensors attached to outer sidewalls of the wave conducting rods, wherein the all-fiber MS sensors are connected to an all-fiber MS monitoring system, and the AE sensors are connected to an AE system; and, monitoring elements for monitoring stress, strain, and displacement are further provided in the model body, and the monitoring elements are connected to a corresponding test system, respectively.

As a further technical solution, the load plates comprise sheet-type load plates, block-type load plates, and an integral-type load plate.

As a further technical solution, the integral-type load plate is located at a bottom of the model body; the sheet-type load plates are located on left, right, and rear side surfaces of the model body, respectively; and, the block-type load plates are located on a top surface of the model body.

As a further technical solution, positions of the all-fiber MS and AE sensors in space cannot be coplanar. Arrangement positions of the sensors are not required, provided that a research object can be covered as comprehensively as possible.

As a further technical solution, seismic isolation antifriction plates are provided on inner walls of the load plates, and are configured for isolating mutual interference between vibration waves in the model body and the load plates.

As a further technical solution, circular holes are drilled in the load plates, and detachable-type limiting rings that are concentric with the circular holes are provided on outer surfaces of the load plates and are fixed by limiting bolts, and the wave conducting rods are sequentially inserted into the limiting rings and the circular holes of the load plates to a specified depth inside the model body.

As a further technical solution, the wave conducting rods are regular prisms and a width of one of four outer sidewalls of the each of the wave conducting rods is greater than a diameter of each of the AE sensors, and the exposed portions of the wave conducting rods are processed with threads matching the all-fiber MS sensors.

As a further technical solution, a transparent acrylic plate and a coal blocking acrylic plate that are spliced together are provided on a front surface of the model test rack, and the acrylic plates are closely attached to the front surface of the model body.

As a further technical solution, a front wall of the model test rack comprises sheet-type latticed-type steel bridges that are hollow in the middle and closed at two ends and are connected by bolts, a pull-out-type front wall, and an acrylic plate, wherein the latticed-type steel bridges may be freely assembled to adapt to coal seams mining model tests under different similar scales; the pull-out-type front wall of the model test rack is provided inside the assembled steel bridges, and is to provide a passive constraint for the model body and reserves an operation space for the simulation of the coal seam mining; and the acrylic plate is provided in a groove of the assembled steel bridges and is configured for providing a passive constraint for the model body and implementing visualized observation of the simulation of the overburden breaking.

According to a second aspect, a test method of the physical model test system for simulating strong mine tremors based on joint monitoring of MS and AE, comprising:

choosing a coordinate origin, and establishing a space rectangular coordinate system;

determining a spatial layout plan of all-fiber MS sensors and AE sensors; and determining 3D coordinates of the all-fiber MS and AE sensors by using the established space rectangular coordinate system as a reference;

drilling circular holes on load plates according to the determined spatial layout plan, and installing detachable-type limiting rings concentric with the circular holes outside the load plates and securing by limiting bolts;

manufacturing a model body by using a layered compaction air-drying method with a height to reach one of the circular holes, then inserting wave conducting rods sequentially into the limiting rings and the circular holes of the load plates to a specified depth inside the model body, and filling with analogue materials and compacting;

bonding the AE sensors at the specified position in outer sidewalls of the wave conducting rods, and screwing the all-fiber MS sensors into ends of the wave conducting rods;

determining whether a MS-AE positioning error meets an accuracy requirement by carrying out a knock positioning test; and if the accuracy requirement is met, then performing the model test, and monitoring and acquiring MS and AE events in real time; otherwise, checking and repairing an all-fiber MS monitoring system, an AE system, and corresponding sensors, and then carrying out the knock positioning test again until the positioning error meets the accuracy requirement.

The present invention has the following significant technical advantages:

(1) In the present invention, the formation and evolution process of strong mine tremors induced by the spontaneous breaking of high thick-and-hard overlying strata under the action of coal seam extraction can be realistically simulated by arranging the wave conducting rods. In addition, the all-fiber MS and AE systems can maximally capture vibration signals generated by overburden breaking, and the positioning results can mutually verify each other to ensure that test results are realistic and reliable. In addition, because the sensors are mounted on the outside of the model body, it is very convenient to mount, detach, test, and repair them.

(2) The front wall of the model test rack of the present invention comprises the sheet-type latticed-type steel bridges that are hollow in the middle and closed at two ends and are connected by bolts, and can be freely assembled to adapt to coal seams mining model tests under different similar scales. The pull-out-type front wall of the model test rack is provided inside the assembled steel bridges, and the pull-out-type front wall of the model test rack provides a passive constraint for the model body and reserves an operation space for the simulation of coal seam mining. Coal seam extraction at positions of different heights can be simulated by adjusting the position of the pull-out-type front wall of the model test rack. The acrylic plate is provided in the groove of the assembled steel bridges, so that while a horizontal displacement constraint of the model body is ensured, fissure extension and stratum breaking of the model can be directly observed.

(3) The present invention also has broad promotion and application value in physical simulation of spontaneous dynamic disasters such as rockburst, coal and gas outburst, and the study of disaster formation mechanisms in deep geotechnical engineering such as hydroelectricity, transportation, energy, mines, and national defense.

BRIEF DESCRIPTION OF THE DRAWINGS

The accompanying drawings of the specification, which constitute a part of the present invention, are used to provide further understanding of the present invention. Exemplary embodiments of the present invention and descriptions thereof are used to explain the present invention, and do not constitute an improper limitation to the present invention.

Figure 1:
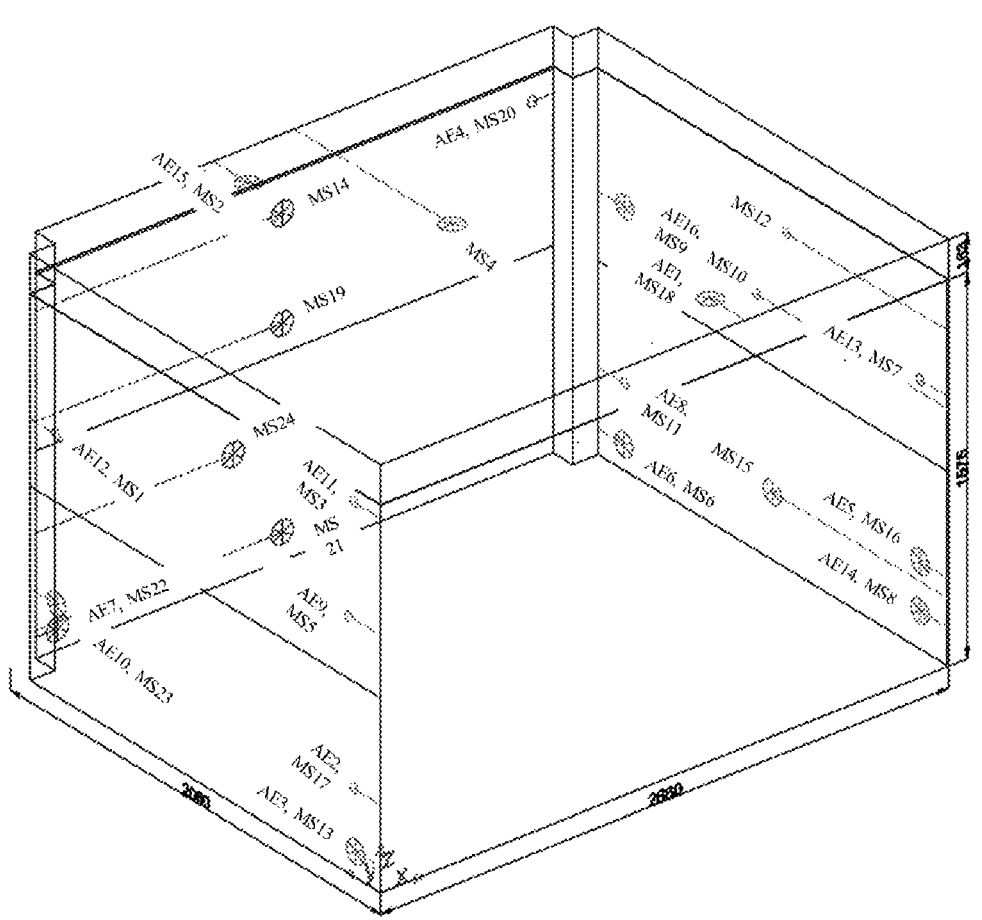
FIG. 1 is a layout plan drawing of twenty-four all-fiber MS sensors and sixteen AE sensors according to the present invention.
Figure 2:
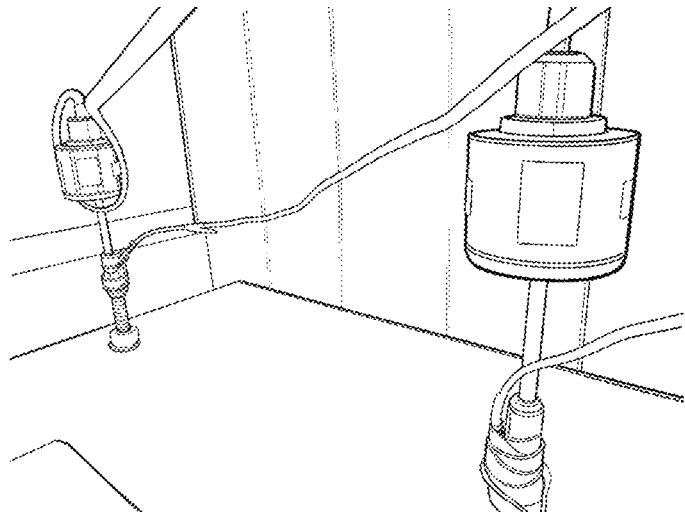
FIG. 2 is an installation photograph of the all-fiber MS sensors and the AE sensors according to the present invention.

In the drawings: 1, all-fiber MS monitoring system; 2, AE system; 3, high-accuracy test system; 4, model test rack; 5, hydraulic servo load control system; 6, regular prism wave conducting rod; 7, screw at the end head of the exposed portion of the wave conducting rod; 8, all-fiber MS sensor; 9, AE sensor; 10, limiting ring; 11, hydraulic jack; 12, bench-type thruster plate; 13, sheet-type load plate; 14, guide frame; 15, model body; 16, monitoring elements of stress, strain, and displacement; 17, connecting member; 18, front wall of the model test rack; 19, pull-out-type front wall of the model test rack; 20, acrylic plate; 21, coal blocking acrylic plate,; 22, optical cable; 23, electrical cable; 24, oil line; 25, limiting bolt; 26, seismic isolation antifriction plate; 27, block-type load plate; 28, integral-type load plate.

DETAILED DESCRIPTION

It should be noted that the following detailed descriptions are exemplary and are intended to provide further description of the present invention. Unless otherwise specified, all technical and scientific terms used herein have the same meanings as commonly understood by a person of ordinary skill in the art to which the present invention belongs.

It should be noted that the terms used herein are merely intended to describe specific implementations, but are not intended to limit exemplary implementations according to the present invention. As used herein, the singular form is intended to comprise the plural form, unless clearly indicated otherwise in the context. In addition, it should be further understood that terms "comprise" and/or "comprising" used in this specification indicate that there are features, steps, operations, devices, assemblies, and/or combinations thereof.

The present invention is further described below with reference to the accompanying drawings and embodiments.

Figures 3, 4, 5:
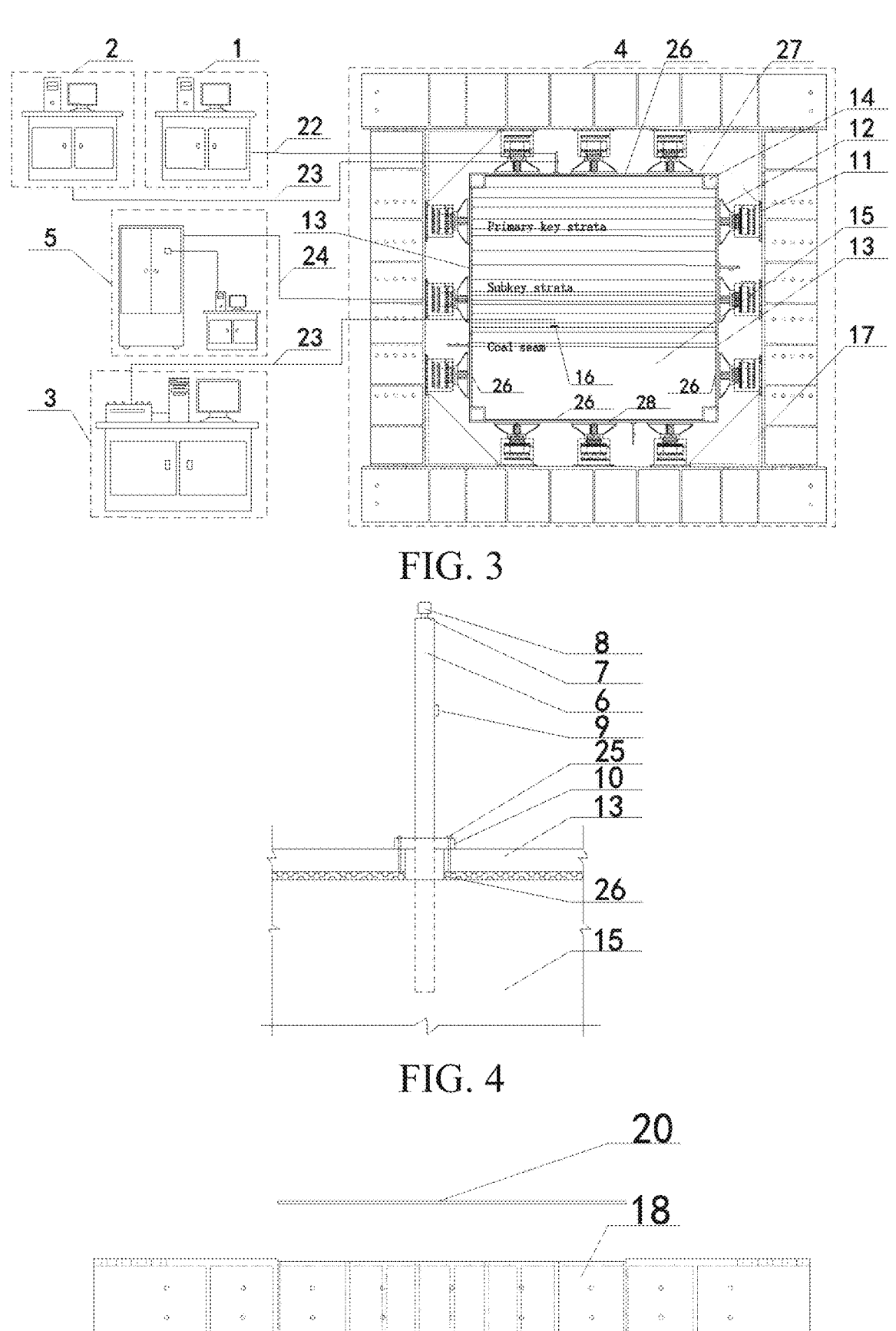
FIG. 3 is an internal schematic diagram of a front view of a model test rack according to the present invention.
FIG. 4 is a schematic diagram of installation of the all-fiber MS sensors and the AE sensors according to the present invention.
FIG. 5 is a top view of a front wall of the model test rack and a transparent acrylic plate in a detached state according to the present invention.

As shown in FIG. 3, a physical model test system for simulating strong mine tremors based on joint monitoring of MS and AE provided in the present embodiment comprises an all-fiber MS monitoring system 1, an AE system 2, a high-accuracy test system 3, a model test rack 4, and a hydraulic servo load control system 5. A model test system may accommodate a large-scale model body with a thickness close to a length and a width, and may apply a true 3D non-uniform load to all outer side surfaces of the model body to realistically simulate an initial in-situ stress field.

Figure 8:
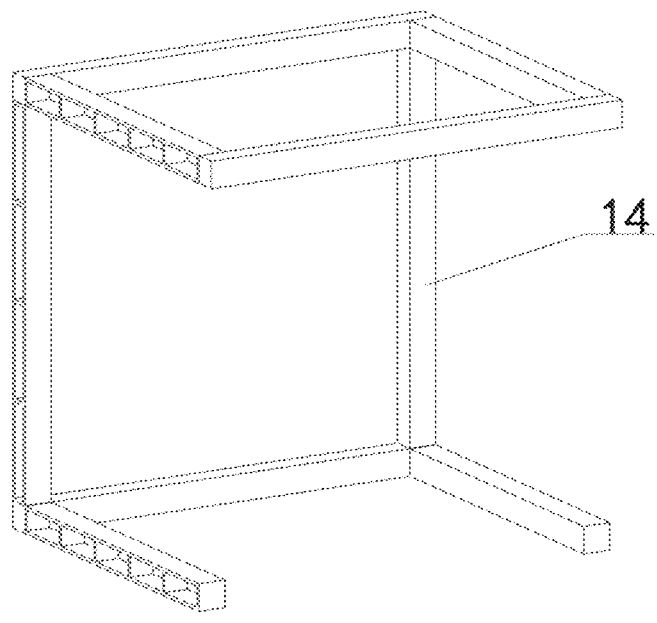
FIG. 8 is a structural design drawing of a guide frame according to the present invention.
Figure 9:
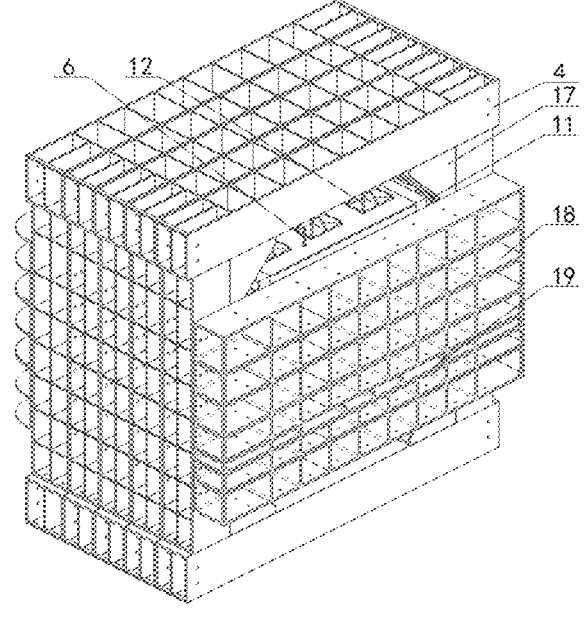
FIG. 9 is a 3D design drawing of the model test rack according to the present invention.

A connecting member 17 is mounted at each of four corners of the model test rack 4. The connecting members 17 are configured for increasing the stiffness of a reaction frame. Thirty-three hydraulic jacks 11 are mounted on the upper, lower, left, right, and rear inner walls of the model test rack 4, and each hydraulic jack 11 is connected to a bench-type thruster plate 12. A guide frame 14 is provided in the model test rack 4, an integral-type load plate 28 is provided at the lower part of the guide frame 14, and the sheet-type load plates 13 are provided on left, right, and rear parts of the guide frame 14; the block-type load plates 27 are provided at the top part of the guide frame 14; and the front part of the guide frame 14 is propped on the front wall of the model test rack 18 (referring to FIG. 7 and FIG. 8 for details). Three types of load plates move within a range defined by the guide frame 14 to eliminate an "edge effect" of true 3D loading, thereby implementing zero mutual interference between movements of the load plates in the surfaces of the model body. The hydraulic servo load control system 5 applies loads to the hydraulic jacks 11 through eight oil lines 24. The sheet-type load plates 13 are divided into three sheets at left, right, and rear surfaces of the model body in a height direction, and gradient loads are applied to implement true 3D gradient non-uniform loading to the model body. The block-type load plates 27 at the top are used to implement sinking of the top surface of the model body, while simultaneously applying servo loading to the load at the top.

Further, the all-fiber MS monitoring system 1 is connected by optical cables 22 to all-fiber MS sensors 8 that are mounted at the model body 15. The all-fiber MS monitoring system 1 can effectively capture a high-energy low-frequency vibration signal of fracturing inside the model body 15. The AE system 2 is connected by electrical cables 23 to AE sensors mounted in the model body 15. The AE system 2 can effectively capture a low-energy high-frequency vibration signal of fracturing inside the model body 15. Through the joint use of the all-fiber MS monitoring system 1 and the AE system 2, all vibration signals of fracturing inside the model body 15 can be captured. The high-accuracy test system 3 is connected to stress, strain, and displacement monitoring elements 16 in the model body 15, and multi-source monitoring information inside the model body 15 is captured and recorded in a test process.

As shown in FIG. 4, seismic isolation antifriction plates 26 are bonded on inner walls of the sheet-type load plates 13, the block-type load plates 27, and the integral-type load plate 28, to isolate the model body 15 from interference of vibration signals in the sheet-type load plate 13, the block-type load plate 27, and the integral-type load plate 28.

Circular holes can be drilled in the sheet-type load plates 13, the block-type load plates 27, and the integral-type load plate 28. Limiting rings 10 concentric with the circular holes are installed outside the load plates and are fixed by limiting bolts 25. Wave conducting rods 6 are regular prisms, which pass through the circular holes in the load plates through the limiting rings 10 to a particular depth inside the model body 15, and the limiting rings 10 are detached after the model body is stably loaded, so that the wave conducting rods 6 are kept from contacting the sheet-type load plates 13, the block-type load plates 27, and the integral-type load plate 28 in the full process of the model test, thereby isolating the wave conducting rods 6 from vibration signals in the sheet-type load plates 13, the block-type load plates 27, and the integral-type load plate 28.

The all-fiber MS sensors 8 are connected to the end heads 7 of the exposed portions of the wave conducting rods, and the AE sensors 9 are bonded at the specified position in the outer sidewalls of the wave conducting rods 6. A knock positioning test is carried out after the sensors are switched on. If a positioning error is within an allowable range, the model test is formally carried out. Otherwise, the all-fiber MS monitoring system 1, the all-fiber MS sensors 8, the AE system 2, and the AE sensors 9 need to be repaired until the positioning error reaches the allowable range.

Figures 6, 7:
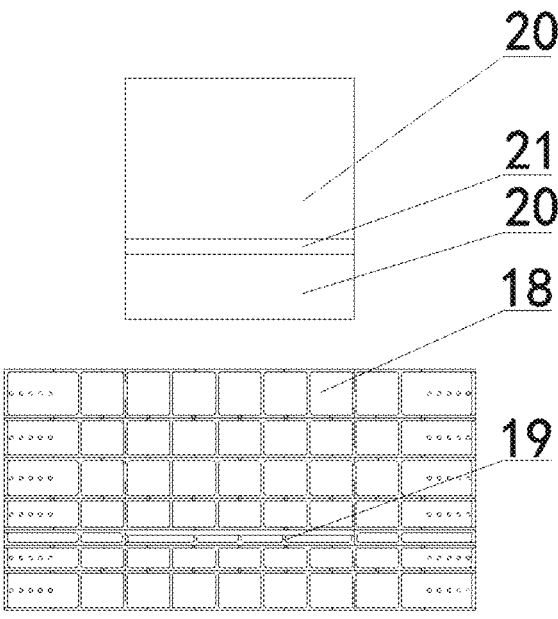
FIG. 6 is a front view of the front wall of the model test rack and the transparent acrylic plate in the detached state according to the present invention.
FIG. 7 is an internal 3D design drawing of the model test rack according to the present invention.

As shown in FIG. 5 and FIG. 6, the front wall of the model test rack 18 in the model test rack 4 is formed by splicing sheet latticed-type steel bridges that are of different heights and hollow in the middle and closed at two ends, and the steel bridges are mounted on the model test rack 4 by high-strength bolts. A groove is opened in an inner wall of the steel bridge, to allow the steel bridge to accommodate an acrylic plate with a thickness of 20 mm. The acrylic plate may be formed by splicing a transparent acrylic plate 20 and a coal blocking acrylic plate 21. The acrylic plates are closely attached to the front surface of the model body 15, and constrains the horizontal displacement of the model body 15 and applies a passive load to the model body 15, and fissure growth and overburden breaking of the model body 15 in a test process can be observed in real time through the front wall of the model test rack 18 and the acrylic plate. A sequence of the sheet latticed-type steel bridges that are of different heights and hollow in the middle and closed at two ends forming the front wall of the model test rack 18 and a pull-out-type front wall of the model test rack 19 may be freely adjusted in a vertical direction for splicing, so that a position of the pull-out-type front wall of the model test rack 19 in the height direction can be flexibly adjusted. Shapes of the pull-out-type front wall of the model test rack 19 and the coal blocking acrylic plate 21 are the same. Before the simulation of coal seam extraction is formally started, the pull-out-type front wall of the model test rack 19 is removed first, and then the coal blocking acrylic plate 21 is removed, to provide an operation space for coal seam extraction. Therefore, the present invention is applicable to working conditions of extracting tests of coal seams with different locations and thickness.

Optionally, the more block-type load plates at the top of the model body, the better the physical simulation results. Six blocks are used as an example in this application. The block-type load plates at the top are configured for independent servo control of the initial vertical in-situ stress fields of the model body. No interference exists between vertical movements of the blocks of the block-type load plates at the top, and each block is independently controlled by an oil cylinder connected thereto.

Further, the distribution of spatial positions of the all-fiber MS and the AE sensors is not clearly required, except that the two cannot be coplanar, and a research object, for example, key strata in this example need to be covered as comprehensively as possible.

Further, the circular holes of the limiting rings are concentric with the circular holes drilled in the load plates, and they are met that the diameter of the circular holes drilled in the load plates is greater than the inner diameter of the limiting rings, and the inner diameter of the limiting rings is greater than an outer diameter of the wave conducting rods. In addition, the limiting rings need to be detached after the model body is stably loaded, the all-fiber MS sensors are connected to the end heads of the exposed portions of the wave conducting rods, and the AE sensors are bonded at the specified position in the outer sidewalls of the wave conducting rods. The objective to is to ensure that the wave conducting rods are kept from contacting the load plates in the model test, to isolate interference from vibration signals in the load plates.

Further, the wave conducting rods are designed into regular prisms and have a width of a single outer side surface greater than the diameter of the AE sensors, and the exposed portions of the wave conducting rods are processed with threads that match the all-fiber MS sensors. The objective of designing the wave conducting rods into regular prisms is to provide a uniform medium and surface for the propagation of vibration waves, and making bonding to the AE sensor more convenient.

Further, before the model test is formally started, a knock positioning test needs to be carried out to verify that positioning accuracy meets a requirement. Seismic isolation antifriction plates are bonded on the inner walls of the load plates in the model test system, and are configured for isolating mutual interference between vibration waves in the model body and the load plates.

Further, the load plates in the model test system are arranged in different configurations according to different spatial positions of the load plates. The load plates at the top are designed in block form. Each block can independently move, and each block is independently controlled by a hydraulic jack connected to the block. A larger quantity of blocks indicates a better effect of physical simulation. The load plates on the left, right, rear surfaces of the model body are designed as sheets in the vertical direction. Each sheet corresponds to three hydraulic jacks, and is configured for performing gradient non-uniform loading on the model body. A larger quantity of sheets indicates a better effect of physical simulation. The load plate at the bottom is designed as an integral type. Six hydraulic jacks at the bottom jointly act on the load plate to apply a uniform initial in-situ stress to the bottom of the model body.

Further, the front wall of the model test rack comprises the sheet-type latticed-type steel bridges that are hollow in the middle and closed at two ends and are connected by bolts, the pull-out-type front wall of the model test rack, and the coal blocking acrylic plate. The latticed-type steel bridges that are hollow in the middle and closed at two ends can be freely assembled to adapt to coal seams mining model tests of under different similar scales. The pull-out-type front wall of the model test rack is connected to the sheet-type latticed-type steel bridges by bolts. In one aspect, a passive constraint is provided for the model body. In another aspect, extraction of the model at positions of different heights can be implemented by adjusting the position of the pull-out-type front wall of the model test rack. To be specific, after the pull-out-type front wall of the model test rack is pulled out, the position is used as an extraction position of the model. The coal blocking acrylic plate provides a passive constraint for the model body and implements visualized observation of the simulation of overburden breaking. The sheet-type latticed-type steel bridges that are hollow in the middle and closed at two ends all have different heights, and requirements of different test schemes can be met by combining the steel bridges in different manners in the height direction. Overlapping regions of the coal blocking acrylic plate and the pull-out-type front wall of the model test rack have the same shape. The acrylic plate is preferably thick rather than being thin. The thickness of the acrylic plate can be flexibly designed according to test requirements.

The present embodiment further provides a test and analysis method according to a physical model test system for simulating strong mine tremors based on joint monitoring of MS and AE, comprising:

choosing a coordinate origin, and establishing a space rectangular coordinate system;

designing a spatial layout plan of all-fiber MS sensors and AE sensors; and determining their 3D coordinates using the established space rectangular coordinate system as a reference;

drilling circular holes in the load plates according to the above layout plan, and installing detachable-type limiting rings concentric with the circular holes outside the load plates and securing them by limiting bolts;

manufacturing a model body by using a layered compaction air-drying method with a height to reach one of the circular holes, then inserting the wave conducting rods sequentially into the limiting rings and the circular holes of the load plates to a specified depth inside the model body, and filling with analogue materials and compacting;

bonding the AE sensors at a specified position in the outer sidewalls of the wave conducting rods, and screwing the all-fiber MS sensors into the end of the wave conducting rods;

determining whether a MS-AE positioning error meets an accuracy requirement by carrying out a knock positioning test; and if the accuracy requirement is met, then performing the model test, and monitoring and acquiring MS and AE events in real time; otherwise, checking and repairing an all-fiber MS monitoring system, an AE system, and corresponding sensors, and then carrying out the knock positioning test again until the positioning error meets the accuracy requirement.

Further, the coordinate origin and the space rectangular coordinate system are chosen according to the rule of facilitating calculation.

The present application may implement monitoring of an overburden breaking signal based on a vibration signal monitoring method. In addition, positioning results of MS and AE may mutually verify each other, thereby ensuring the reliability of test results. Because the sensors are installed on the outside of the model body, it is very convenient to install, detach, test, and repair the two sensors.

The front wall of the model test rack of the present application is designed into latticed-type steel bridges that are of different heights and hollow in the middle and closed at two ends, and can adapt to model test schemes of extraction of different models and of a same model under various working conditions of at coal seam of different heights. In addition, acrylic plates are equipped on the front wall, so that while a horizontal displacement constraint of the model body is ensured, fissure extension and stratum breaking of the model can be directly observed.

Specific implementations of the present invention are described above in conjunction with the accompanying drawings, but are not used to limit the scope of protection of the present invention. A person skilled in the art should understand that various modifications or variations that can be made by a person skilled in the art without creative efforts still fall within the scope of protection of the present invention.

The foregoing descriptions are merely preferred embodiments of the present invention, but are not intended to limit the present invention. A person skilled in the art may make various modifications and changes may the present invention. Any modification, equivalent replacement, improvement, or the like made within the spirit and principle of the present invention shall fall within the protection scope of the present invention.

The invention claimed is:

1. A physical model test system for simulating strong mine tremors based on joint monitoring of microseismic (MS) and acoustic emission (AE), comprising a combined-type visualization reaction combined rack apparatus, hydraulic jacks are mounted on an inner wall of the combined-type visualization reaction combined rack apparatus, and are configured to drive load plates applying a load to a model body; wherein, the physical model test system further comprises wave conducting rods, a built-in portion of each of the wave conducting rods is inserted inside the model body, an exposed portion of the each of the wave conducting rods extends to an outer side of the load plates, all-fiber MS sensors are installed at ends of exposed sections of the wave conducting rods, and AE sensors are attached to designated positions in a plane of an outer wall of the exposed section of the each of the wave conducting rods; the all-fiber MS sensors are connected to an all-fiber MS monitoring system, and the AE sensors are connected to an AE system; positions of the all-fiber MS sensors and the AE sensors in space are not coplanar; combined use of the all-fiber MS monitoring system and the AE system, wherein the all-fiber MS and the AE systems are configured to maximally capture vibration signals generated by overburden breaking, and positioning results obtained thereby may mutually verify each other to ensure that test results are realistic and reliable; and, monitoring elements for monitoring stress, strain, and displacement are further provided in the model body, and the monitoring elements are connected to a corresponding test system, respectively;

wherein each of the load plates is manufactured by cutting a uniform and flat thick steel plate, and is manufactured to be a shape comprises any one of a sheet-type load plate, a block-type load plate, and an integral-type load plate; wherein, the integral-type load plate is located at a bottom of the model body; the sheet-type load plates are located on left, right, and rear side surfaces of the model body, respectively; and, the block-type load plates are located on a top surface of the model body.

2. The physical model test system for simulating strong mine tremors based on joint monitoring of MS and AE according to claim 1, wherein seismic isolation antifriction plates are provided on inner walls of the load plates.

3. The physical model test system for simulating strong mine tremors based on joint monitoring of MS and AE according to claim 1, wherein circular holes are drilled in the load plates, and detachable-type limiting rings that are concentric with the circular holes are provided on outer surfaces of the load plates and are fixed by limiting bolts; and, a diameter of each of the circular holes is greater than an inner diameter of each of the limiting rings, and the inner diameter of the each of the limiting rings is greater than an outer diameter of the each of the wave conducting rods.

4. The physical model test system for simulating strong mine tremors based on joint monitoring of MS and AE according to claim 1, wherein the each of the wave conducting rods is of a regular prism shape, and a width of one of four outer sidewalls of the each of the wave conducting rods is greater than a diameter of each of the AE sensors, and the exposed portions of the wave conducting rods are processed with threads matching the all-fiber MS sensors.

5. The physical model test system for simulating strong mine tremors based on joint monitoring of MS and AE according to claim 1, wherein acrylic plates are provided on a front surface of the model test rack, and are closely attached to the front surface of the model body.

6. The physical model test system for simulating strong mine tremors based on joint monitoring of MS and AE according to claim 1, comprising sheet-type latticed-type steel bridges that are hollow in the middle and closed at two ends and are connected by bolts, a pull-out-type front wall, and an acrylic plate, wherein the latticed-type steel bridges may be freely assembled to adapt to coal seams mining model tests under different similar scales; the pull-out-type front wall of the model test rack is provided inside the assembled steel bridges, and is to provide a passive constraint for the model body and reserves an operation space for the simulation of the coal seam mining; and the acrylic plate is provided in a groove of the assembled steel bridges and is configured for providing a passive constraint for the model body and implementing visualized observation of the simulation of the overburden breaking.

7. A test method by using a physical model test system for simulating strong mine tremors based on joint monitoring of MS and AE according to claim 1, comprising:

choosing a coordinate origin, and establishing a space rectangular coordinate system;

determining a spatial layout plan of all-fiber MS sensors and AE sensors; and determining three-dimensional (3D) coordinates of the all-fiber MS and AE sensors by using the established space rectangular coordinate system as a reference;

drilling circular holes on load plates according to the determined spatial layout plan, and installing detachable-type limiting rings concentric with the circular holes outside the load plates and securing by limiting bolts;

manufacturing a model body by using a layered compaction air-drying method with a height to reach one of the circular holes, then inserting wave conducting rods sequentially into the limiting rings and the circular holes of the load plates to a specified depth inside the model body, and filling with analogue materials and compacting;

bonding the AE sensors at the specified position in outer sidewalls of the wave conducting rods, and screwing the all-fiber MS sensors into ends of the wave conducting rods;

determining whether a MS-AE positioning error meets an accuracy requirement by carrying out a knock positioning test; and if the accuracy requirement is met, then performing the model test, and monitoring and acquiring MS and AE events in real time; otherwise, checking and repairing an all-fiber MS monitoring system, an AE system, and corresponding sensors, and then carrying out the knock positioning test again until the positioning error meets the accuracy requirement.

\* \* \* \* \*